(12) United States Patent
Barua et al.

(10) Patent No.: US 10,821,485 B2
(45) Date of Patent: Nov. 3, 2020

(54) SYSTEM AND METHOD OF POWDER REMOVAL

(71) Applicant: General Electric Company, Schenectady, NY (US)

(72) Inventors: Ananda Barua, Glenville, NY (US); Daniel Jason Erno, Clifton Park, NY (US); Arunkumar Natarajan, Schenectady, NY (US); Ken Ivcar Salas Nobrega, Schenectady, NY (US); Uttara Vijay Kumar, Glenville, NY (US); John Francis Morrison, East Greenbush, NY (US)

(73) Assignee: General Electric Company, Schenectady, NY (US)

(*) Notice: Subject to any disclaimer, the term of this patent is extended or adjusted under 35 U.S.C. 154(b) by 160 days.

(21) Appl. No.: 16/003,798

(22) Filed: Jun. 8, 2018

(65) Prior Publication Data
US 2019/0374983 A1    Dec. 12, 2019

(51) Int. Cl.
*B08B 5/02* (2006.01)
*B08B 5/04* (2006.01)

(52) U.S. Cl.
CPC . *B08B 5/02* (2013.01); *B08B 5/04* (2013.01)

(58) Field of Classification Search
CPC .................................. B08B 5/02; B08B 5/04
USPC ...................................................... 134/102.1
See application file for complete search history.

(56) References Cited

U.S. PATENT DOCUMENTS

| | | | |
|---|---|---|---|
| 8,017,055 B2 | 9/2011 | Davidson et al. |
| 8,167,999 B2 | 5/2012 | Alam et al. |
| 8,185,229 B2 | 5/2012 | Davidson |
| 8,221,858 B2 | 7/2012 | Mannella et al. |
| 2009/0000479 A1 | 1/2009 | Streichsbier et al. |
| 2011/0129640 A1 | 6/2011 | Beall et al. |
| 2016/0228929 A1 | 8/2016 | Williamson et al. |
| 2017/0036401 A1 | 2/2017 | Donovan et al. |
| 2017/0095888 A1 | 4/2017 | Butcher |
| 2017/0144381 A1 | 5/2017 | Ott et al. |
| 2017/0144382 A1 | 5/2017 | Ott et al. |
| 2017/0232670 A1 | 8/2017 | Joerger et al. |
| 2017/0297108 A1 | 10/2017 | Gibson et al. |
| 2019/0344505 A1 | 11/2019 | Sachs et al. |

FOREIGN PATENT DOCUMENTS

DE    102004053719 B3    4/2006

OTHER PUBLICATIONS

DE102004053719B3—Machine translation (Year: 2004).*
International Search Report, dated Aug. 30, 2019, for International application No. PCT/US2019/036066 (6 pgs.).
Bai et al., "Binderless Jetting: Additive Manufacturing of metal parts via jetting nanoparticles", Solid Freeform Fabrication 2017: Proceedings of the 28th Annual International, pp. 249-260, 2017.

* cited by examiner

*Primary Examiner* — Tinsae B Ayalew
(74) *Attorney, Agent, or Firm* — Armstrong Teasdale LLP

(57) ABSTRACT

A powder removal system includes a plurality of tubes including upstream and downstream ends, a manifold fluidly coupled to the tubes, and a pressurized air supply fluidly coupled to the manifold supplying pressurized air to the tubes via the manifold. The downstream ends of the tubes are inserted into a plurality of channels partially filled with powder.

19 Claims, 7 Drawing Sheets

SYSTEM AND METHOD OF POWDER REMOVAL

BACKGROUND

The present disclosure relates generally to powder removal methods and systems for manufacturing.

Additive manufacturing or three-dimensional (3-d) printing is a process of forming an article one layer at a time. Several modalities or methods of additive manufacturing utilize a powder-bed printing process where a layer of powder is deposited and a roller or scraper is used to level the height of the powder. A sourced of heat may be introduced to the powder selectively to melt or fuse the powder. Alternatively, a binder may be selectively applied to the powder after the powder is leveled. The process is repeated until the geometry of a part or component is printed.

When the part is embedded in the powder bed during printing many or all internal structures may be filled with powder, which may be metallic and/or other materials. Post-process steps such as heat treat, surface finishing and subtractive manufacturing processes are often performed to further enhance the properties or geometry of the part. While the part is still being manufacturing, it is in a "green" state. The green part may be less robust than a fully finished part, and special techniques may be required to de-powder the green part such that the part itself does not break during handling and de-powdering, especially for parts with complex internal geometries and cavities.

SUMMARY OF THE INVENTION

In one aspect, a powder removal system includes a plurality of tubes including upstream and downstream ends, a manifold fluidly coupled to the tubes, and a pressurized air supply fluidly coupled to the manifold supplying pressurized air to the tubes via the manifold. The downstream ends of the tubes are inserted into a plurality of channels partially filled with powder.

In another aspect, a method of powder removal includes providing an array of tubes, inserting the tubes into a plurality of channels that are at least partially filled with powder, and dispensing compressed air out of the tubes. Each tube is sufficiently narrow to allow powder to stream past the tube within a channel of the plurality of channels.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 9 is an enlarged side view of components of the powder removal system; and.

Figure 1:
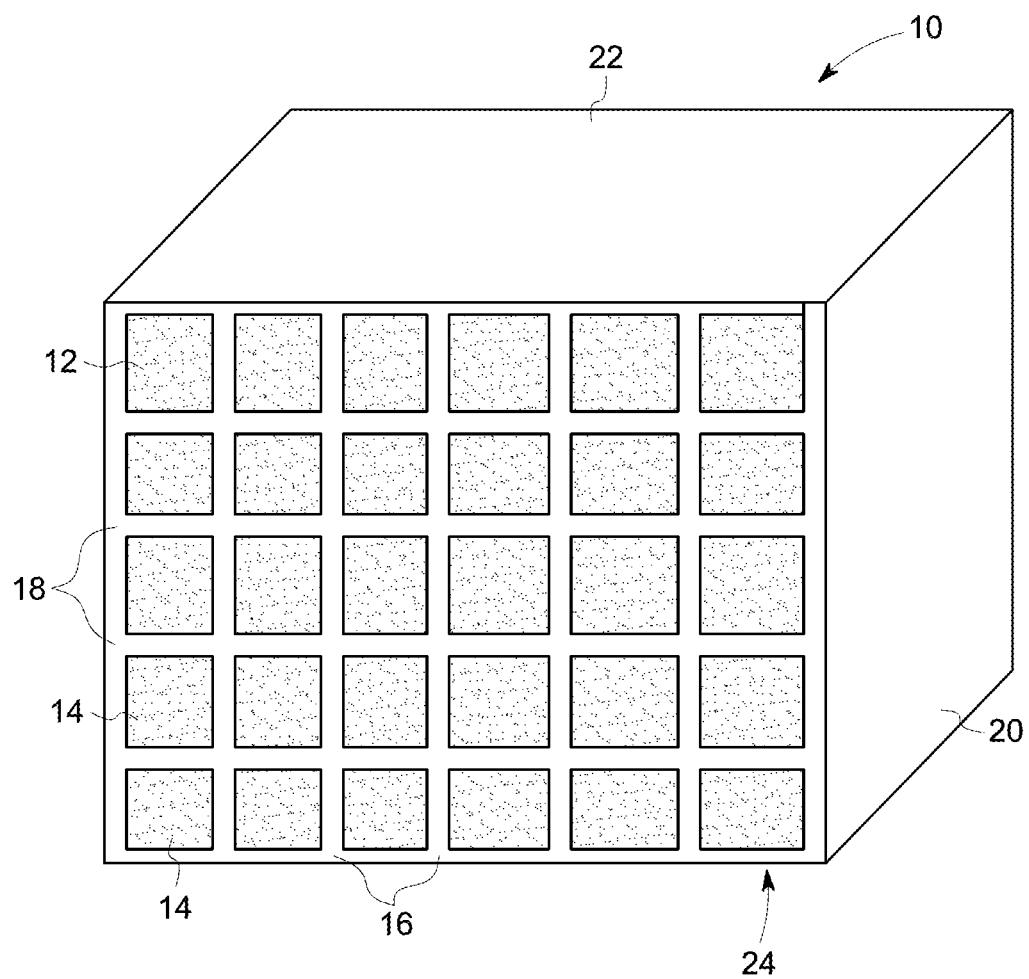
FIG. 1 is an illustration of a powder-filled part formed via additive manufacturing.

Unless otherwise indicated, the drawings provided herein are meant to illustrate features of embodiments. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the term "modality" refers to any additive manufacturing build methods and processing including but not limited to binder jetting, directed energy deposition, material extrusion, selective laser melting (SLM), material jetting, powder bed fusion, sheet lamination, welding, brazing, vat photopolymerization, stereolithography (SLA), direct metal laser melting (DMLM), fused deposition modeling (FDM), direct metal laser sintering (DMLS), and electron beam melting (EBM). There are also additive modalities that do not utilize powder. Additive manufacturing is also referred to as a generative build process.

As used herein, the term "powder" may to various materials including but not limited to metallic, ceramic and polymer powders. Powder characteristics such as size, material, density and other properties may depend on the modality being employed.

As used herein, the terms "de-powder" and "powder removal" refer to the process of removing excess powder from a part following or during the build phase.

Among the additive manufacturing build methods that employ powder bed modalities and/or powder as an input material, there are variations in powder size distribution leading to varying packing density of the powder. For example, for many modalities, a higher powder packing density is desired in order to decrease the porosity of the resulting finished part. For other modalities, lower powder packing densities are desired in order to increase the flowability of the powder which may enhance the resolution of the fine feature details of the process. As such, powder removal may be more challenging in some additive modalities than for others, especially modalities for which powder removal occurs while the part is in a green state, because of limitations in the ability to shake or vibrate the green part without damaging it.

The methods and embodiments described herein provide enhanced removal of powder from additively manufactured parts and other parts, especially parts with complex internal geometries, those made via powder bed additive manufacturing modalities, and those with fine feature details. In addition, methods and embodiments described herein enhance powder removal with additive modalities such as binder jet, where the part remains in a green state post-printing (prior to heat treatment) during which time the part is structurally less robust and not able to accommodate large vibrations from shaking which is often used as a means for removing powder.

FIG. 1 is an illustration of a part 10 made via additive manufacturing. The part may be in a green state, and not fully finished. The part 10 includes a plurality of horizontally and vertically spaced channels 14 defined between a plurality of vertical walls 16 and a plurality of horizontal walls 18. The part 10 may include at least one side wall 20, a top surface 22 and a bottom surface 24. Each channel of the plurality of horizontally and vertically spaced channels 14 is filled with powder 12 as a result of manufacturing via a powder bed additive manufacturing process. The plurality of horizontally and vertically spaced channels 14 appear with rectangular and/or square cross-sections in the embodiment of FIG. 1. However, channels with other cross-sectional shapes such as but not limited to circles, triangles, parallelograms, polygons, and other shapes are also possible. In addition, cavities other than channels such as voids, reservoirs, plenums, lattice structure voids, ducts, manifolds, etc. are also possible.

Figure 2:
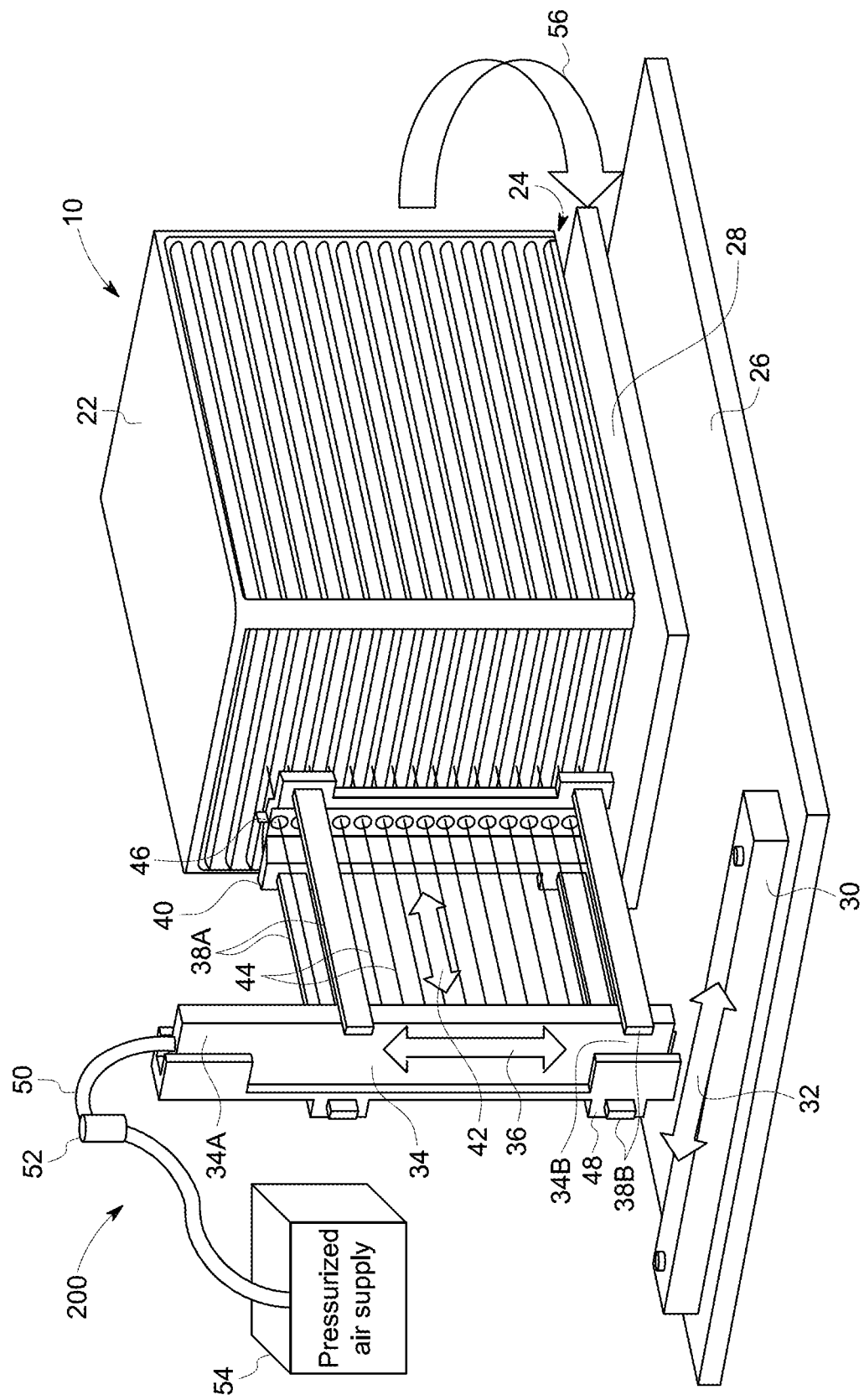
FIG. 2 is an illustration of a powder removal system.

FIG. 2 is an illustration of a powder removal system 200 for removing powder from a part 10. The powder removal system 200 includes a manifold 34 oriented along a vertical direction 36 and mechanically coupled to a set of top rails 38A and a set of bottom rails 38B. The top and bottom rails 38A and 38B extend along a depth-wise direction 42 to a vertically oriented guide 40 which includes a plurality of vertically-spaced guide holes 46. The top and bottom rails 38A and 38B allow for movement of a plurality of tubes 44 in a depth-wise direction 42 allowing the tubes 44 to be inserted into the channels 14 at a range of desired depths. Stated otherwise, the tubes 44 may be moved to multiple channel depths using the top and bottom rails, 38A and 38B. The plurality of tubes 44 extend in a depth-wise direction 42 between the manifold 34 and guide 40 such that each of the tubes 44 extends through a guide hole 46 toward the part 10. The guide 40 and guide hole(s) 46 prevent the air tubes 44 from drooping or sagging over the distance they are spanning between the manifold 34 and the channels 14. A sleeve 48 is mechanically coupled to the manifold 34 such that the sleeve brackets both a manifold top end 34A and a manifold bottom end 34B, and allows for vertical translation of the manifold 34 so that all portions of part 10 may be accessed by the plurality of tubes 44. An air supply line 50 is fluidly coupled to the manifold top end 34A such that air may be delivered to an interior of the manifold 34. The sleeve 48 and/or manifold 34 may be mechanically coupled to a horizontal rail 30. Other mechanical couplings other than sleeves 48 and/or brackets can also be used to attach the manifold 34 to the horizontal rail 30. Similarly, other mechanical couplings other than the top and bottom rails, 38A and 38B can be used to attach the guide 40 to the manifold 34. In other embodiments, only one rail or set of rails may be used in place of the top and bottom rails, 38A and 38B. In other embodiments, the horizontal rail 30 itself may be able to modulate or translate along an alignment platform 26 in a depth-wise direction 42 in addition to a horizontal direction 32, thereby eliminating the need for the top and bottom rails, 38A and 38B.

Still referring to FIG. 2, a pressure control valve 52 is disposed in fluid communication with the air supply line 50 upstream of the manifold 34 for controlling the pressure of the air within the air supply line 50. A pressurized air supply 54 is in fluid communication with, and upstream of the pressure control valve 52. Pressurized air supplied to the manifold 34 via the pressure control valve 52 and air supply line 50 flows to the interior of the manifold 34 where it enters at least one tube of the plurality of tubes 44, which are each fluidly coupled to the interior of the manifold 34. Air flows through the plurality of tubes 44 into the plurality of horizontally and vertically spaced channels 14, where it causes powder 12 in the channels 14 to loosen and flow out of the channels 14. In other embodiments, it may be desirable to use gas such, as inert gas, rather than air as the de-powdering fluid in instances, for example, where excess temperatures and/or potentially volatile and/or combustible materials are present. In other embodiments, it may be desirable to use other fluids and/or liquids rather than pressurized gas. The part 10 may include pluralities of vertical and horizontal walls 16 and 18 that are arranged in a repeating pattern such that the horizontally and vertically spaced channels 14 are also repeating. As such, the plurality of tubes 44 and guide holes 46 are arranged in a vertical configuration as shown in FIG. 2, as well as in an array with more than one horizontal columns in a horizontal configuration (not shown). Stated otherwise, the plurality of tubes 44 and guide holes 46 may be arranged in vertical arrays and/or horizontal arrays. Additionally, in other embodiments, other configurations may be used such as 2 horizontal rows with 8 vertical columns, 12 horizontal rows with 3 vertical columns, or 4 horizontal rows with 4 vertical columns, etc.

During powder removal, the part 10 may sit on a removable platform 28 that is capable of rotation 56 about a vertical axis to allow powder 12 to be removed from the part 10 from multiple sides. The removable platform 28 may sit on an alignment platform 26 which allows the powder removal system 200 to be aligned with the features and geometries of the part 10. The structures of the powder removal system 200 including the manifold 34, sleeve 48, guide 40, top and bottom rails 38A and 38B, and plurality of tubes 44 may be articulated along each of three axes including the depth-wise direction 42, the vertical direction 36 and a horizontal direction 32. This three-axis arrangement allows the plurality of tubes 44 to be inserted into the plurality of horizontally and vertically spaced channels 14 at various depths to aid in powder removal. In addition, this three-axis arrangement allows the plurality of tubes 44 to be movable for accessing the full part 10 from the top surface 22 to the bottom surface 24 via movement of the manifold 34 along the sleeve 48, as well as the full range of locations along the horizontal direction 32 via movement along the horizontal rail 30. The plurality of tubes 44 may be inserted into the plurality of channels 14 at multiple depths then withdrawn entirely prior to movement in the horizontal direction 32 and/or the vertical direction 36. Stated otherwise, in some embodiments, depending on the geometry of the part 10 and the plurality of channels 14, the plurality of tubes 44 may not be able to be moved in the horizontal direction 32 or the vertical direction 36 while they are still inserted into the plurality of channels 14.

Figure 3:
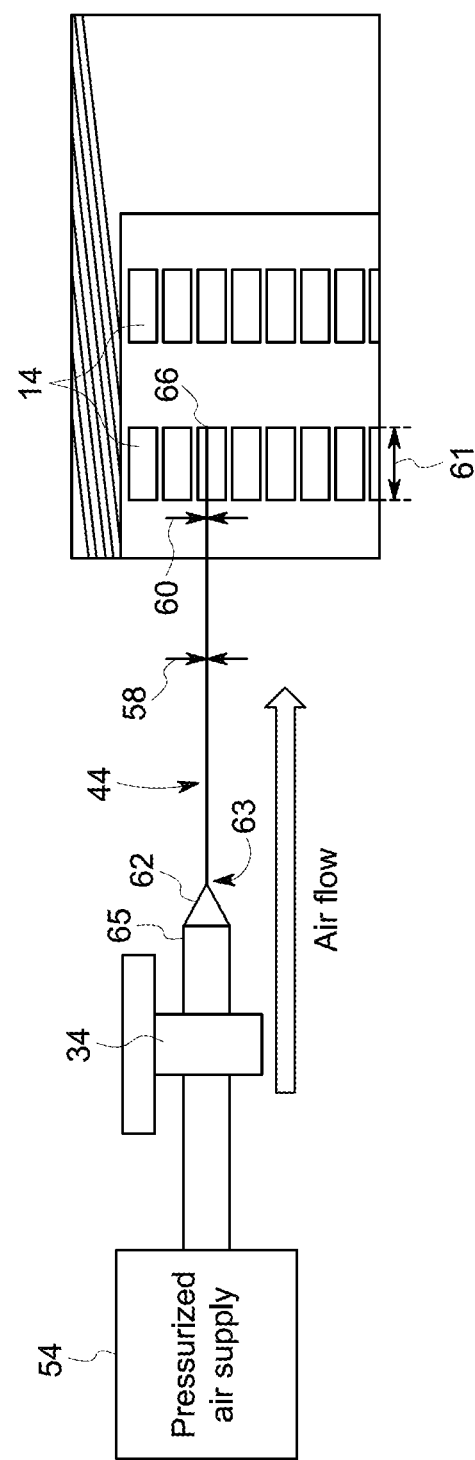
FIG. 3 is an enlarged side view of components of the powder removal system.

FIG. 3 illustrates a tube 44 with an outer diameter 58 that is smaller than channel height 60 and channel width 61 so that the tube may fit within the channel 14. The tube 44 includes a converging portion 62 at an upstream end 63. The embodiment of FIG. 3 also illustrates a sealing portion 65 upstream of the converging section 62 that aids in allowing the tube 44 to be fluidly sealed to the manifold 34 via a gasket or other sealing device (not shown) allowing a fluid seal to be maintained during movement along the depth-wise direction 42. The converging section 62 decreases the flow area of the passage through which air flows such that the sealing portion 65 has a larger diameter than the tube 44. The converging section 62 increases the velocity of the air (or inert gas) through the tube 44 (following the principles of the ideal gas law) which aids in the powder removal process after air is discharged from a tube downstream end 66.

Figure 4:
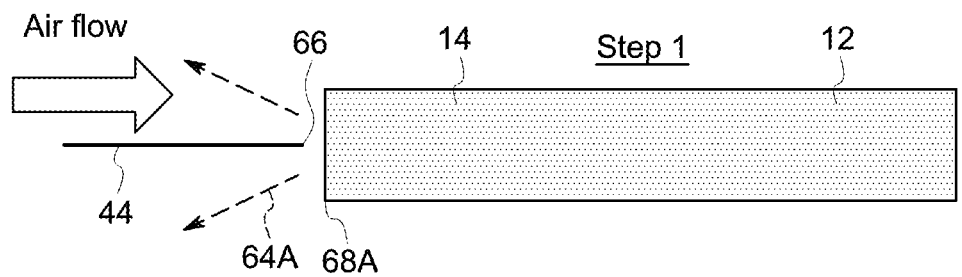
FIG. 4 is an enlarged side view of components of the powder removal system.

FIG. 4 illustrates a tube 44 discharging air from the downstream end 66 into a channel 14 that is filled with powder 12. The discharged air pushes the powder 12 such that a first powder stream 64A exits the channel 14 at a proximate end 68A of the channel 14.

Figure 5:
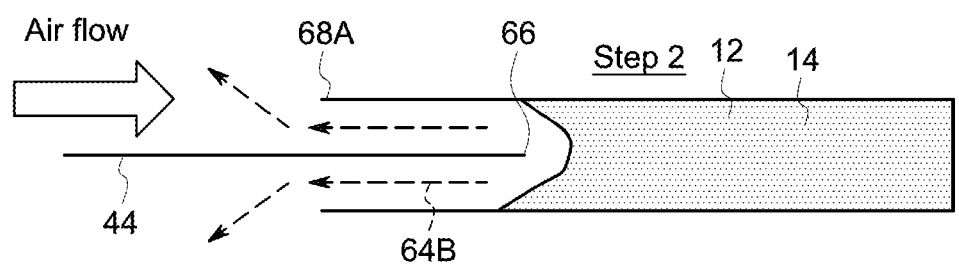
FIG. 5 is an enlarged side view of components of the powder removal system.

FIG. 5 illustrates a tube 44 discharging air from the downstream end 66 into a channel 14 that is partially filled with powder 12. In the illustration of FIG. 5, the downstream end 66 of the tube 44 is inserted into the interior of the channel 14. The discharged air pushes the powder 12 such that a second powder stream 64B travels back through the channel 14 toward the proximate end 68A of the channel 14. As illustrated, the downstream end 66 of the tube 44 is narrow enough to allow the second powder stream 64B to travel past it within the channel 14 toward the proximate end 68A of the channel 14. In addition, the downstream end 66 of the tube 44 is sufficiently narrow such that the discharged air does not cover the entire cross section of the channel 14, again allowing powder 12 to flow toward the proximate end 68A of the channel 14. In one embodiment, the cross-sectional area of the tube 44 is in a range of about 0.1 to about 10 percent of the cross-sectional area of the channel 14. In another embodiment, the cross-sectional area of the tube 44 is in a range of about 0.5 to about 5 percent of the cross-sectional area of the channel 14. In another embodiment, the cross-sectional area of the tube 44 is in a range of about 1 to about 4 percent of the cross-sectional area of the channel 14. In another embodiment, the cross-sectional area of the tube 44 is in a range of about 2 to about 3 percent of the cross-sectional area of the channel 14. In another embodiment, the cross-sectional area of the tube 44 is in a range of about 2.2 to about 2.8 percent of the cross-sectional area of the channel 14. In another embodiment, the outer diameter of the tube 44 is in a range of about 1 to about 50 percent of a minimum dimension of the channel 14. In another embodiment, the outer diameter of the tube 44 is in a range of about 20 to about 45 percent of a minimum dimension of the channel 14. In another embodiment, the outer diameter of the tube 44 is in a range of about 25 to about 40 percent of a minimum dimension of the channel 14. In another embodiment, the outer diameter of the tube 44 is in a range of about 30 to about 35 percent of a minimum dimension of the channel 14.

Figure 6:
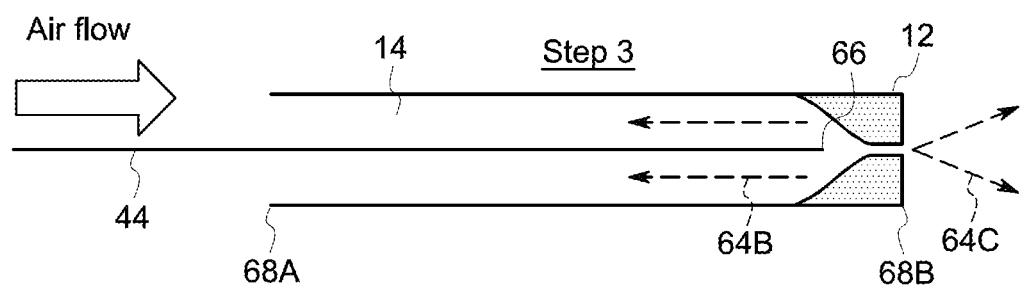
FIG. 6 is an enlarged side view of components of the powder removal system.

FIG. 6 illustrates a tube 44 discharging air from the downstream end 66 into a channel 14 that is partially filled with powder 12. In the illustration of FIG. 6, the downstream end 66 of the tube 44 is inserted into the interior of the channel 14 a greater distance than in the embodiment of FIG. 5. The discharged air pushes the powder 12 such that a second powder stream 64B travels back through the channel 14 toward the proximate end 68A. In addition, the air discharged from the downstream end 66 of the tube 44 begins to push powder 12 out of a distal end 68B of the channel 14, forming a third powder stream 64C.

Figure 7:
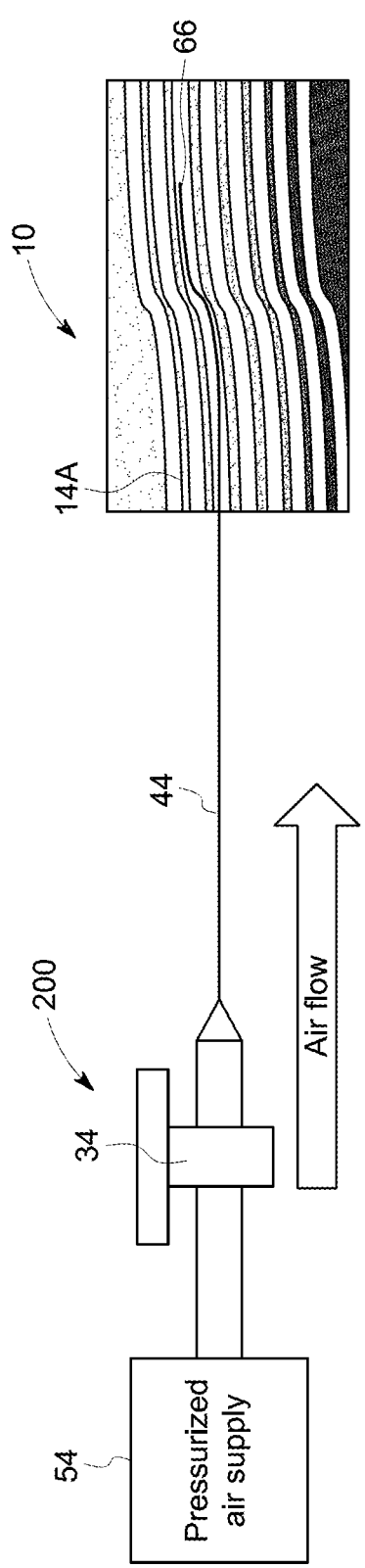
FIG. 7 is an enlarged side view of components of the powder removal system.

FIG. 7 is an embodiment of the powder removal system 200 that may be used with parts 10' that have contoured and (or non-linear) channels 14A. The pressurized air supply 54 provides air to the manifold 34 and tube 44' that is discharged into the contoured channel 14A via the downstream end 66 of the tube 44'. The downstream end 66 of tube 44', in the embodiment of FIG. 7, is partially flexible so as to allow the tube 44 to flex according to internal walls of the contoured channel 14A during the powder removal process.

Figure 8:
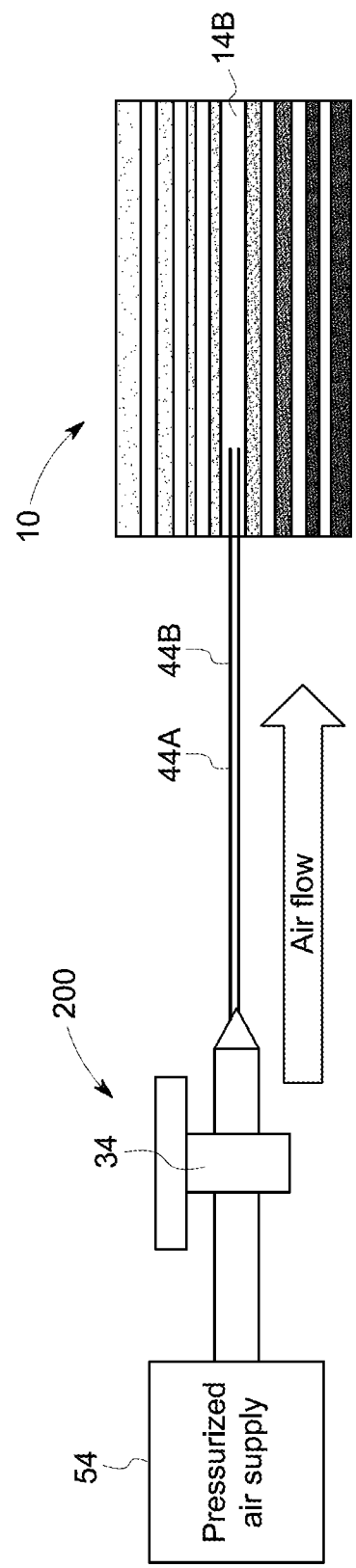
FIG. 8 is an enlarged side view of components of the powder removal system.

FIG. 8 is an embodiment of the powder removal system 200 that may be used with parts 10" that have varying-sized channels 14B. The pressurized air supply 54 provides air to the manifold 34, a first tube 44A and a second tube 44B, which is then discharged into the channel 14B via the downstream end 66 of the tubes 44A and 44B. The first and second tubes 44A 44B, in the embodiment of FIG. 7, discharge additional air compared to a configuration with a single tube 44, to adjust for the size of the channel 14B during powder removal process. In other embodiments, other numbers of tubes may be used. In another embodiment, single-tube configurations including different sized tubes 44 may be used.

Figure 9:
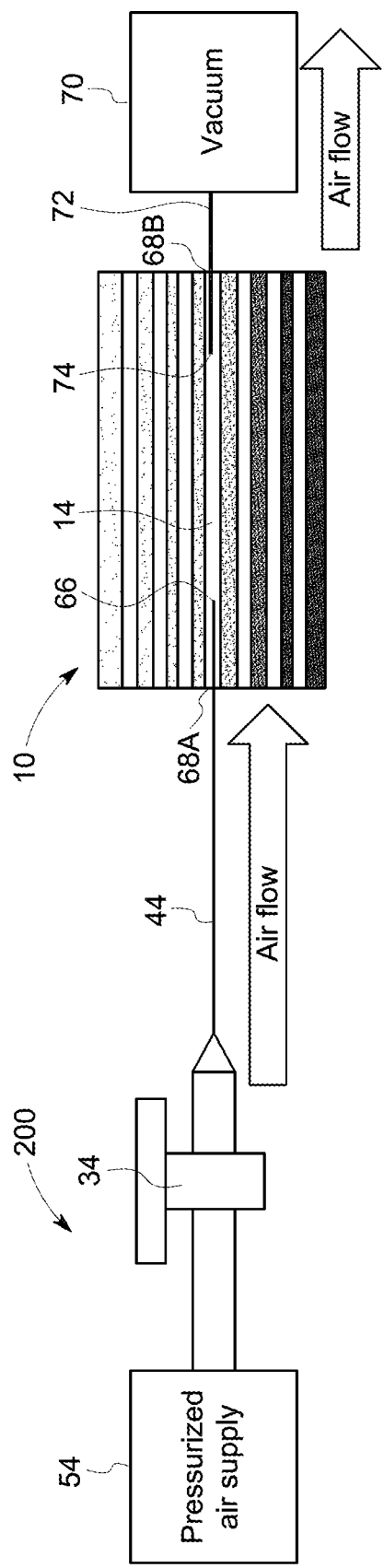

FIG. 9 is an embodiment of the powder removal system 200A including a negative pressure source, such as a vacuum 70 and at least one vacuum tube 72. The pressurized air supply 54 provides air to the manifold 34 which is discharged into the channel 14 via the downstream end 66 of the tube 44, which is inserted into the channel proximate end 68A. A suction end 74 of the vacuum tube 72 is inserted into channel distal end 68B. The vacuum tube 72 is fluidly coupled to the vacuum 70. In operation, powder (not shown) is suctioned through the vacuum tube 72 at the channel distal end 68B while the tube 44 delivers fluid gas flow that forces powder out of the channel 14 at the proximate end 68A and/or the distal end 68B. In other embodiments, the vacuum tube 72 and the air tube 44 may be inserted into channels 14 on the same end of the part (i.e., a channel proximate end 68A or channel distal end 68B) rather than at opposing ends.

Figure 10:
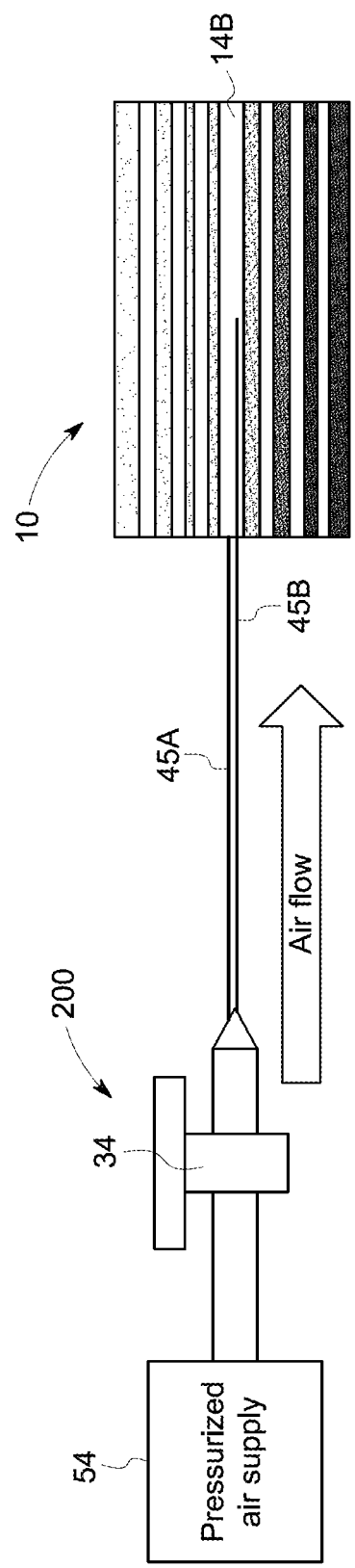
FIG. 10 is an enlarged side view of components of the powder removal system, in accordance with the present embodiments.

FIG. 10 is an embodiment of the powder removal system 200 that includes a first air tube 45A with a pressure that is less than atmospheric and a second air tube 45B with a positive internal pressure. The second air tube 45B extends further into the channel 14B for blowing powder 12 out of the channel 14B. The first air tube 45A creates a suctioning force to pull powder 12 out of the channel 14B via a suctioning force.

In operation, the powder removal system 200, 200A may be programmed such that a powder removal algorithm is automatically executed according to the specific features and geometries of the part 10. For example, various articulations of the powder removal system 200 in the horizontal direction 32, the vertical direction 36 and the depth-wise direction 42, as well as rotation of the removable platform 28 may be performed in various combinations and steps to enhance the removal of powder 12 from the part 10. The powder removal system 200 may include a pressurized air supply 54 that produces pressurized air at a pressure that is less than atmospheric thereby creating a vacuum via the air tubes 44 in cases where it is desirable to use suction forces rather than blowing to remove the powder 12.

In addition, various feedback sensors may be included in the powder removal system 200 such as cameras (not shown) to visually inspect the powder 12 during powder removal and scales mounted to the removable platform 28 or alignment platform 26 to weigh the part 10, in order to assess the mass of powder 12 still remaining in the part 10, (i.e., since an approximate weight of the part 10 without powder would likely be known). These feedback sensors may be used in controlling the powder removal system 200. In addition, a relief valve (not shown) may be disposed within the manifold 34 so that the internal pressure within the manifold 34 and tubes 44 does not exceed a predetermined threshold, thereby ensuring that excessive air pressure will not damage the part 10.

Similarly, each air tube 44 may be outfitted with a static pressure sensor (not shown) and/or a flow valve (not shown) so as to monitor and regulate the pressure within each air tube 44, as well as to selectively control the airflow to each tube 44 during the powder removal process. The manifold 34 may include configurable arrays so that the plurality of tubes 44 may be arranged in multiple horizontal rows and or vertical columns as necessary based on the geometry of the part 10 and channels 14. Embodiments of the plurality of tubes 44 may include multiple tubes 44 as well as flexible and non-flexible tubes 44 being used simultaneously within the same manifold 34. Embodiments of the plurality of tubes 44 may also include multiple tubes 44 in configurations other than rectangular arrays, such as star configurations, triangular configurations as well as any other configuration or pattern that may be desirable or productive for removing powder 12, based on the specific geometry or layout of a specific part 10. In addition, because the depths of the channels 14 may vary, it may be desirable for one or more tubes 44 to be inserted into the respective channel(s) 14 at different depth-wise 42 distances than other tubes 44.

The powder removal system 200 may include multiple manifolds 34 that are configured similarly as well as differently in order to accommodate multiple geometries of more than one part 10 and/or multiple aspects of a single part 10. The manifold(s) 34 may be configurable so that the sizes, types and arrangements of tubes 44, etc. may be adjusted to accommodate multiple part 10 geometries. The manifold(s) 34 may be equipped with quick-connect/quick-disconnect type fittings to allow the pressure supply line 50 to be easily connected and disconnected from the manifold(s) 34, in order to accommodate, for example parts 10 with different geometries. In such an arrangement, the manifold(s) 34 may be interchangeable. In one embodiment, the powder removal system 200 may include multiple manifolds 34 arranged around the removable platform 28 and/or around the alignment platform 26. The multiple manifolds 34 may be configured similarly or differently. The removable platform 28 is capable of rotation 56 about a vertical axis and therefore may rotate based on the geometry of the part 10 in order to align the part 10 with one of the manifolds 34 that includes a desired configuration for removing powder 12 from the part 10. For example, manifolds 34 may be arranged on each of four sides surrounding the removable platform 28 and/or around the alignment platform 26 thereby providing a powder removal system 200 capable of removing powder 12 from many different part 10 geometries, shapes and/or channel 14 dimensions. Other embodiments of the powder removal system 200 may include different numbers of manifolds 34. In still other embodiments, the powder removal system 200 may include one or more manifolds 34 that revolves around a central platform or base that supports the part 10, for example, where the part 10 is large and hard to move, (i.e., rather than the part 10 rotating on a removable platform 28).

Using a tube 44 that is narrow relative to a cross section of the channel 14 allows the tube 44 to be inserted into the channel 14, and also allows loose powder 12 to be forced back out of the channel 14 by the discharged air toward the proximate end 68A. Other arrangements of components described herein may be used in connection with the powder removal system 200 according to the present embodiments to achieve similar effect. The tubes 44, manifold 34, sleeve 48, guide 40, rails 38A, 38B and removable plate 28 may be articulated in the vertical, horizontal and depth-wise directions 36, 32, and 42 via gears, hydraulics, guidewires, cables, chains, pulleys, linkages, motors, pressurized air, magnets, pistons, track systems and other devices. In addition, modulation of the tubes 44 and other structures in any of the vertical, horizontal and depth-wise directions 36, 32, and 42 may be an iterative process, as desired, to loosen and remove powder 12 within the channels 14. For example, moving the tubes 44 back and forth along a depth-wise direction 42 within a plurality of channels 14 may enhance powder removal to allow the fluid gas flow to be directed at areas where powder 12 has accumulated at a variety of distance ranges and/or angles.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A powder removal system comprising:
   at least one tube comprising an upstream end and a downstream end;
   at least one manifold fluidly coupled to the upstream end of the at least one tube;
   a sleeve mechanically coupled to the at least one manifold, the sleeve comprising at least one bracket, wherein the at least one bracket is mechanically coupled to the at least one manifold at at least one of a manifold top end and a manifold bottom end, and wherein the sleeve allows relative motion in a vertical direction between the sleeve and the at least one manifold; and
   at least one pressurized fluid supply fluidly coupled to the at least one manifold, the at least one pressurized fluid supply supplying pressurized fluid to the at least one tube via the at least one manifold,
   wherein the downstream end of the at least one tube is inserted into at least one channel, the at least one channel being partially filled with powder.

2. The system of claim 1 further comprising:
at least one fluid supply line fluidly coupled between the at least one pressurized fluid supply and the at least one manifold; and
at least one pressure control valve disposed in the at least one fluid supply line.

3. The system of claim 1 further comprising:
at least one guide; and
a plurality of guide holes disposed in the at least one guide,
wherein the at least one tube further comprises a plurality of tubes, and wherein the plurality of tubes are disposed through the plurality of guide holes.

4. The system of claim 3 further comprising:
at least one rail,
wherein the at least one rail mechanically couples the at least one manifold to the at least one guide, and
wherein the at least one rail guides the at least one tube when inserted into the at least one channel at multiple channel depths.

5. The system of claim 1 further comprising:
an alignment platform forming a base of the powder removal system.

6. The system of claim 5 further comprising:
a horizontal rail mechanically coupled to, and disposed on, the alignment platform,
wherein the horizontal rail is mechanically coupled to the sleeve and allows relative motion in a horizontal direction between sleeve and the horizontal rail.

7. The system of claim 6, wherein the at least one tube may be translated in each of the vertical direction, the horizontal direction and a depth-wise direction,
wherein the depth-wise direction is aligned with a depth to which the at least one tube is inserted within the at least one channel.

8. The system of claim 1, the at least one tube further comprising:
a converging section at the upstream end, the converging section comprising a decreased flow area.

9. The system of claim 1 wherein the upstream end of the at least one tube is partially flexible.

10. The system of claim 1 wherein the at least one tube further comprises:
a first tube; and
a second tube.

11. The system of claim 1, further comprising:
a vacuum; and
a vacuum tube fluidly coupled to the vacuum.

12. The system of claim 11 wherein an upstream end of the vacuum tube is inserted into at least one distal end of the at least one channel for suctioning powder out of the at least one channel.

13. The system of claim 7, further comprising:
a removable platform disposed on the alignment platform, the removable platform allowing rotation about a vertical axis of a part in which the at least one channel is disposed.

14. The system of claim 13, further comprising
at least one fluid supply line fluidly coupled between the at least one pressurized fluid supply and the at least one manifold; and
at least one pressure control valve disposed in the at least one fluid supply line.

15. The system of claim 14, further comprising:
a vacuum; and
a vacuum tube fluidly coupled to the vacuum,
wherein an upstream end of the vacuum tube is inserted into at least one distal end of the at least one channel for suctioning powder out of the at least one channel.

16. A method of powder removal comprising:
providing a plurality of tubes, the plurality of tubes fluidly coupled to at least one manifold, the at least one manifold mechanically coupled to a sleeve having at least one bracket, wherein the at least one bracket is mechanically coupled to the at least one manifold at at least one of a manifold top end and a manifold bottom end, and wherein the sleeve allows relative motion in a vertical direction between the sleeve and the at least one manifold;
inserting the plurality of tubes into a plurality of channels, the plurality of channels at least partially filled with powder; and
dispensing compressed fluid out of the plurality of tubes,
wherein each tube of the plurality of tubes is sufficiently narrow to allow powder to stream past the tube within a channel of the plurality of channels.

17. The method of claim 16, further comprising:
modulating a depth at which the plurality of tubes is inserted into the plurality of channels.

18. The method of claim 17, further comprising:
modulating the plurality of tubes in at least one of a vertical direction and a horizontal direction.

19. The method of claim 16, further comprising:
providing a vacuum and a at least one vacuum tube fluidly coupled to the vacuum;
inserting the at least one vacuum tube into at least one distal end of at least one channel of the plurality of channels; and
suctioning powder within at least one channel of the plurality of channels via the vacuum and the at least one vacuum tube.

* * * * *